United States Patent [19]
Epstein

[11] Patent Number: 5,894,539
[45] Date of Patent: Apr. 13, 1999

[54] LINE LIGHT SOURCE HAVING LIGHT PIPE WITH RECTANGULAR CROSS-SECTION

[75] Inventor: Kenneth A. Epstein, St. Paul, Minn.

[73] Assignee: Minnesota Mining and Manufacturing Company, St. Paul, Minn.

[21] Appl. No.: 08/575,899

[22] Filed: Dec. 20, 1995

Related U.S. Application Data

[63] Continuation of application No. 08/265,230, Jun. 24, 1994, abandoned.

[51] Int. Cl.$^6$ .................................................. G02B 6/00
[52] U.S. Cl. .................................... 385/133; 362/26
[58] Field of Search ........................... 362/26, 304, 327, 362/339; 359/40, 49, 831, 833, 837; 385/133, 136, 140, 146, 147, 901

[56] References Cited

U.S. PATENT DOCUMENTS

| | | | |
|---|---|---|---|
| 3,752,974 | 8/1973 | Baker et al. | 240/1 EL |
| 4,017,155 | 4/1977 | Yagi et al. | 350/160 LC |
| 4,252,416 | 2/1981 | Jaccard | 350/345 |
| 4,282,560 | 8/1981 | Kringel et al. | 362/26 |
| 4,737,896 | 4/1988 | Mochizuki et al. | 362/301 |
| 4,929,062 | 5/1990 | Guzik et al. | 350/345 |
| 5,303,322 | 4/1994 | Winston et al. | 385/146 |
| 5,467,208 | 11/1995 | Kokawa et al. | 359/149 |

FOREIGN PATENT DOCUMENTS 2 246 231  1/1992  United Kingdom.

*Primary Examiner*—Akm E. Ullah
*Attorney, Agent, or Firm*—H. Sanders Gwin, Jr.

[57] ABSTRACT

A line light source comprising a point line source, e.g., a light emitting diode (LED), and a light pipe having a rectangular, e.g., square, cross-section. Light rays from the point light source enter one end of the light pipe and travel along the length of the pipe. The light rays are reflected off notches or step-facets on one of the four sides of the light pipe. The light rays then pass across the light pipe and exit from the side of the light pipe opposite the notched/faceted side. The square cross-section of the light pipe of the present invention preserves the modes emitted from the point light source, i.e., the cone of emission from the light pipe is about the same as that from the light source. The light source converts a point light source to a line light source which emits light rays at a relatively uniform intensity along the length of the light pipe.

19 Claims, 7 Drawing Sheets

LINE LIGHT SOURCE HAVING LIGHT PIPE WITH RECTANGULAR CROSS-SECTION

This application is a continuation of 08/265,230 filed on Jun. 24, 1994, now abn.

FIELD OF THE INVENTION

The present invention relates generally to the field of line light sources, and more particularly to line light sources comprising point light sources and light pipes.

BACKGROUND OF THE INVENTION

Displays such as billboards, mall displays, and pixellated displays, e.g., liquid crystal displays, are typically illuminated for viewing either from the rear of the display, i.e., "backlit," or from the front of the display using either ambient lighting or side lighting. When front lighting, also known as sidelighting, is used, a light source is provided at one or both sides of the display and is raised slightly above the plane of the display to allow the light to be directed down onto the display. However, because the height of the light source over the plane of the display is usually small compared with the length of the display, light rays from the light source strike the display at an angle of incidence approaching 90° (i.e., tangent to the surface). As a result, most of the light is lost via glancing angle reflection at the display surface and is not available to the viewer.

SUMMARY OF THE INVENTION

The present invention solves this problem by providing a film on the display designed to maximize the light transmitted to the display, thereby increasing the amount of light available to the viewer. The present invention includes a flat display, such as a liquid crystal display, a transparent film on the display, a reflector on the opposite side of the display, and a light source. The film has many tiny ridges on the side opposite the display. Light rays are directed toward the film at a glancing angle and are bent toward the display by the ridges. The light rays travel through the display once, are reflected by the reflector back through the display a second time, exit the film, and proceed toward the viewer at angles ranging from 0° to ±30° to the normal of the display.

The pitch of the ridges is preferably greater than one ridge per pixel. In one embodiment, the ridges have angles α and β of 70° to 90° and 40° to 50°, respectively, and are separated by a face parallel to the display, as shown in FIG. 2. In another embodiment, the ridges are separated by a face that is tilted at an angle δ within the range of about 1° to 3° with respect to the display, as shown in FIG. 6. In yet another embodiment, angle α is from 5° to 20° and angle β is from 60° to 90°, and the ridges are immediately adjacent each other, as shown in FIG. 5. In still yet another embodiment, a groove is provided adjacent each ridge on the side of the ridge opposite the light source, as shown in FIG. 7.

The light source may be comprised of a point light source, such as a light emitting diode, and a light pipe for converting the point source into a line source. The light pipe may have a rectangular cross-section and have notches on the side of the pipe opposite the display. In the alternative, the pipe may have steps on the side opposite the display that gradually decrease the thickness of the pipe as one moves along the pipe away from the light source.

DETAILED DESCRIPTION

Figure 1:
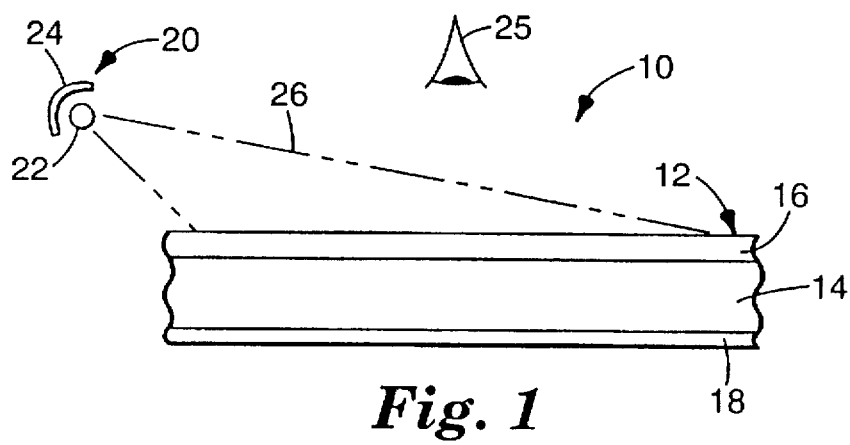
FIG. 1 shows a schematic side view of a front lighting system according to one embodiment of the present invention.

A front lighting system according to the present invention is shown in FIG. 1. System 10 is comprised of display panel 12 and light source 20. Display panel 12 is comprised of display 14, grazing incidence refracting film 16 on the side of the display that faces a viewer 25, and reflector 18, e.g., a diffuse reflector, on the opposite side of the display. Display 14 may be any display, including a pixellated display such as a liquid crystal display. Light source 20 is comprised of light tube 22 and optional reflector 24. As shown in FIG. 1, light source 20 provides a light beam 26 which illuminates the front of display panel 12.

Figure 2:
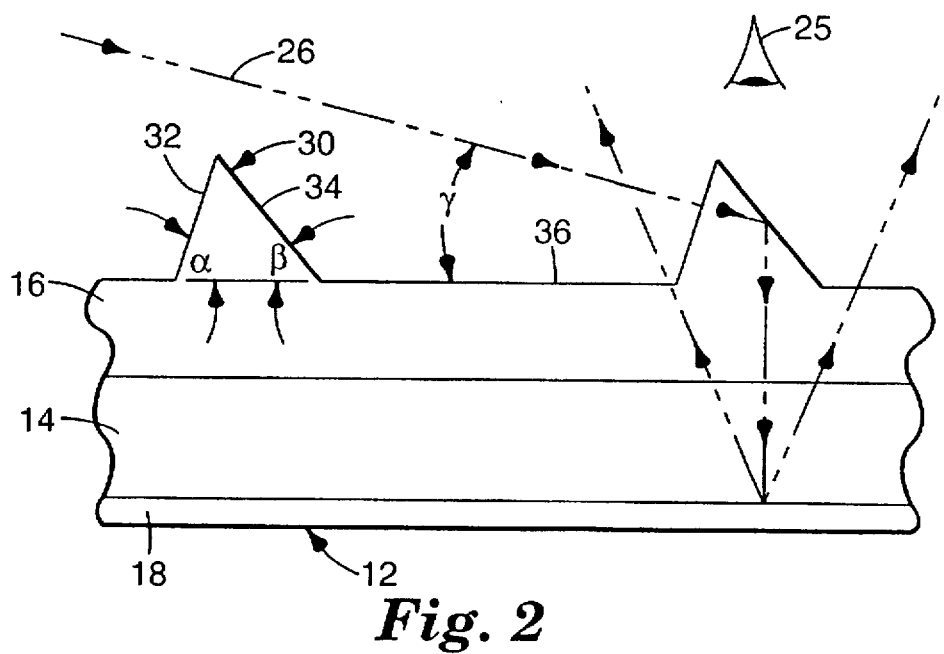
FIG. 2 shows a schematic side view of a grazing incidence refracting film according to one embodiment of the present invention.

A close-up schematic side view of film 16 is shown in FIG. 2. Film 16 is comprised of ridges 30 having first and second faces 32 and 34. Ridges 30 are separated by face 36 which is, but need not be, parallel to the bottom of film 16. The shape of ridges 30 is determined by angles α and β. Light rays 26 are incident on display panel 12 (and thus on film 16) at a glancing angle γ, e.g., 2°. Light rays 26 enter a face 32 of ridge 30 at or near normal incidence. Light rays 26 continue through ridge 30, are reflected at face 34 by total internal reflection, and continue down through film 16 in a direction approximately normal to display panel 12. Light rays 26 pass through display 14 to back reflector 18, where the rays are reflected and diffused back through display 14. Light rays 26 exit display panel 12 via face 36 and proceed toward viewer 25 at angles ranging from 0 to ±30° to the normal of display panel 12.

The height and separation of ridges 30 is a function of the angle γ that light rays 26 from light source 20 strike display panel 12. Ridges 30 should not be so high or so close together that face 32 of one ridge prevents light rays 26 from reaching a face 32 of a neighboring ridge. For a liquid crystal display, ridges 30 are preferably less than 100 µm high, and more preferably within the range of from about 5 µm to 20 µm high, e.g., 9 µm. Angle α is preferably equal to about 90°-γ, i.e., within the range of from about 70° to 90° and more preferably from about 85° to 90°, e.g., 88°. For the angles α above, angle β is preferably within the range from about 30° to the total internal reflection limit, e.g., 54° for γ=3° and a film 16 having an optical index of 1.6, and is more preferably within the range of about 40° to 50°, e.g., 45°. Angle γ is preferably within the range of from about 0° to 5°, e.g., 2°. The distance between the peaks of adjacent ridges 30 is preferably about 5 to 100 times the heights of the ridges, and preferably within the range of from about 10 to 20, and more preferably about 15.

In an alternative embodiment, a second light source (not shown) similar to light source 20 may be provided on the opposite end of display panel 12 so that light rays from the light sources strike ridges 30 from both directions. In this case, the shape of ridges 30 should be symmetrical so that α=β, e.g., =54°.

If display 14 is a pixellated display, e.g., a liquid crystal display, a pitch of one or more ridges per pixel ensures that the display can be viewed in its entirety. Reflector 18 can be white diffuse, brushed metal, or a particle/resin composite.

Film 16 is preferably a polymer sheet such as polycarbonate. Film 16 is preferably adhered to display 14 via lamination or by ultraviolet (UV) cure. Ridges 30 should cover only a small fraction of the surface area of display 14, i.e., preferably less than 20% and more preferably less than 10%. The majority of the surface of the display should be flat (i.e., face 36) to allow most of the light exiting the display to be undisturbed by the refracting surface structure.

Figure 3:
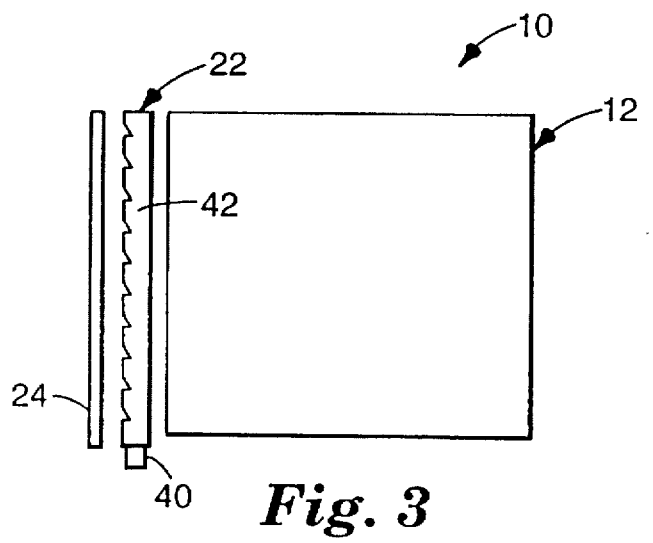
FIG. 3 shows a top schematic view of a front lighting system according to another embodiment of the present invention.

In one embodiment of the present invention, light tube 22 may be comprised of a line of point light sources with corresponding collimating microlenses, a cylindrical lens, or a linear lenticular lens. In another embodiment, a light tube 22 may be comprised of a point light source 40 and a light pipe 42, as shown in FIG. 3. Point light source 40 may be a light emitting diode (LED). LEDs typically have a narrow cone of light emission and operate efficiently in the range of from about 5 to 10 lumens/watt.

Light pipe 42 preferably has a rectangular, e.g., square, cross-section, which preserves the modes emitted from point light source 40, i.e., the cone of emission from light pipe 42 is about the same as that of the light source. This would not be true if light pipe 42 had non-parallel or curved surfaces.

Figure 4A:
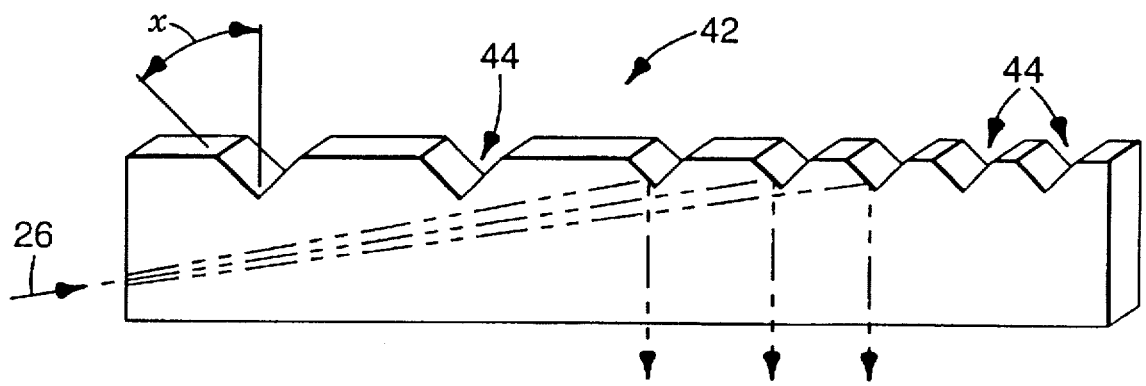
FIGS. 4A and 4B show schematic perspective views of alternative embodiments of a light pipe according to the present invention.
Figure 4B:
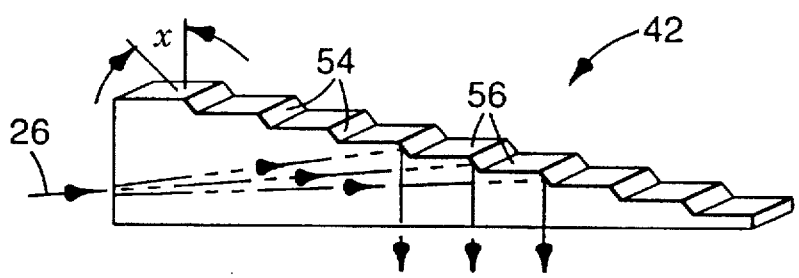

Alternative embodiments of light pipe 42 are shown in FIGS. 4A and 4B. In FIG. 4A, light pipe 42 has a plurality of notches 44 in the surface of the light pipe opposite the direction that light rays from point light source 40 will be directed by the light pipe, i.e., opposite the side of the light pipe adjacent display panel 12. Notches 44 preferably form an angle χ x of about 45°. The pitch, i.e., frequency, of notches 44 is preferably non-uniform to improve the uniformity of illumination from one end of light pipe 42 to the other. An increasing density of notches 44 compensates for the drop in luminous flux density as light is removed from light pipe 42 proceeding away from point light source 40. The pitch of notches 44 could be from about 5 to 100/cm.

An alternative embodiment of light pipe 42 is shown in FIG. 4B. In FIG. 4B, light pipe 42 is wedge-shaped and has a plurality of step-facets 54 which extract light from the pipe and direct it out the opposite side of the light pipe, as discussed above with respect to FIG. 4A. As in the case of FIG. 4A, the preferred angle χ of step-facets 54 is about 45°. Faces 56 are preferably parallel to the opposite surface of light pipe 42, i.e., parallel to the length of step-facets 54, and are preferably uniform across the length of the light pipe to provide uniform illumination across the length of the light pipe.

Figure 5:
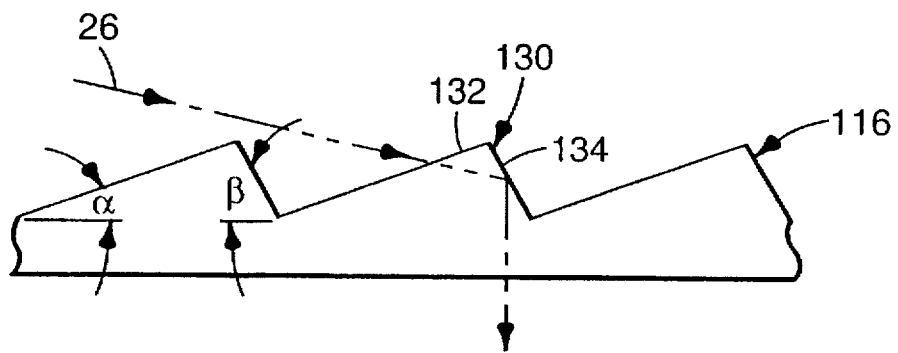
FIGS. 5-7 show schematic side views of alternative embodiments of a grazing incidence refracting film according to the present invention.
Figure 6:
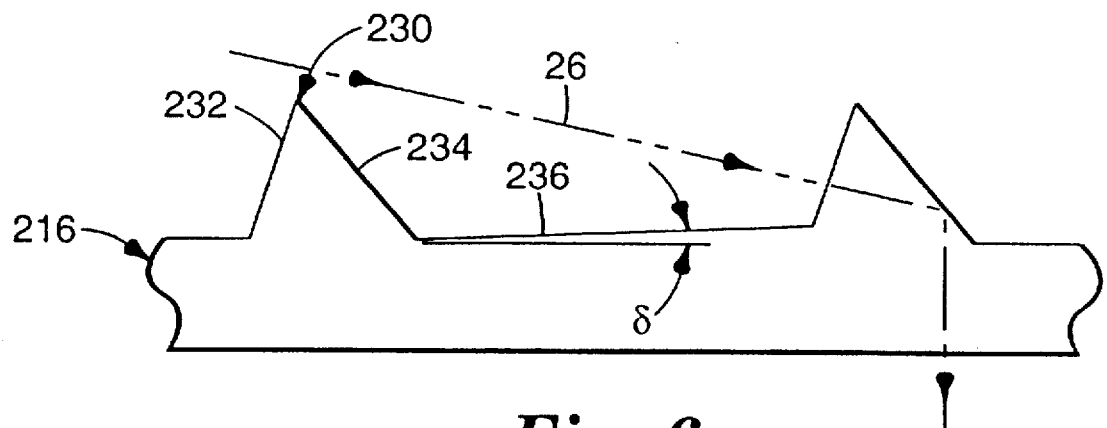
Figure 7:
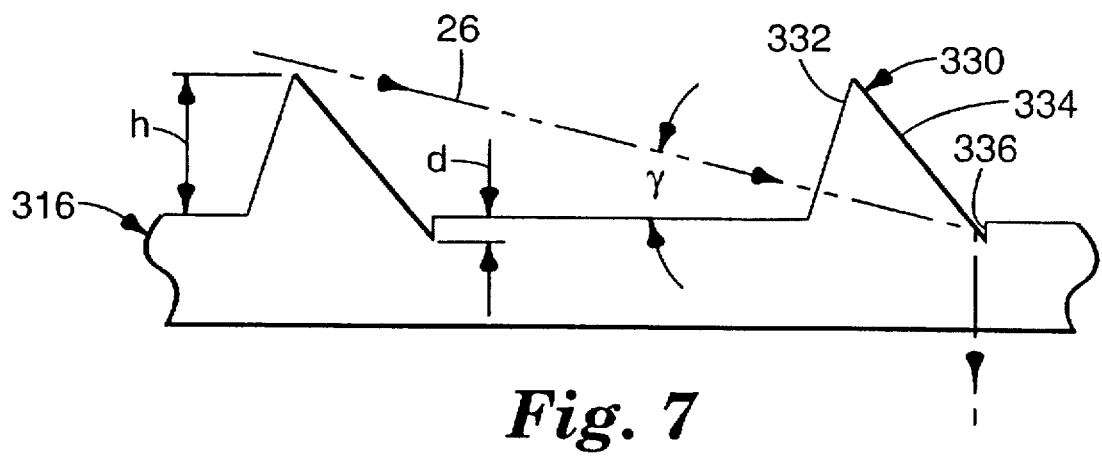

Alternative embodiments of film 16 are shown in FIGS. 5–7. FIG. 5 shows a film 116 having ridges 130, each having a gradual face 132 and a steep face 134. There is no face parallel to the bottom of film 116. However, the slope of faces 132 is so gradual that the refractive secondary image from face 134 is negligible.

Angle α is preferably within the range of from about 5° to 20°, with 5° being the lower limit for satisfactory transmission of glancing incidence rays, and 20° being the upper limit for high contrast viewing. Angle β is preferably within the range of from about 60° to 90°. The distance between peaks of adjacent ridges 130 is preferably about 3 to 10 times greater than the heights of the ridges. The design of film 116 allows for ease of manufacturing ridges 130 that are less fragile than ridges 30 in film 16.

The efficiency of face 34 in film 16 (FIG. 2) can be improved by either decreasing the size of face 32 or increasing the size of face 34, as illustrated by FIGS. 6 and 7, respectively. As shown in FIG. 6, film 216 resembles film 16 with the exception that unlike face 36 of film 16, face 236 of film 216 is not parallel with the back of the film. Film 216 has a plurality of ridges 230 having faces 232 and 234. Face 236 is inclined at an angle δ that is correlated with angle γ formed by the light rays from the light source. For 1°<γ<3°, 1°<δ<3°, approximately. Because face 236 is inclined at an angle δ, the size of face 232 is decreased. In an alternative embodiment of the present invention, angle δ is negatively correlated with angle γ so that for 1°<γ<3°, -1°>δ>-3°.

As shown in FIG. 7, film 316 is comprised of ridges 330 having faces 332 and 334 and grooves 336 provided adjacent face 334. Assuming the use of light rays having an angle δ less than 6°, the depth d of grooves 336 should be at least about ⅕ that of the height h ridges 330. Grooves 336 allow for an increase in the size of face 334.

The invention will now be further described with respect to the following non-limiting Examples. All measurements are approximate.

EXAMPLE 1

A system 10 as shown in FIG. 1 having a film 16 as shown in FIG. 2 was modelled with a computer ray tracing program. Light source 20 (without optional reflector 24) was comprised of a 5 mm high light 22 which was aimed down toward display panel 12 at a 2° angle. Display panel 12 was 100 mm wide and pixels having a center-to-center separation of 300 µm. Ridges 30 were 9 µm high and had a peak-to-peak spacing of 100 µm. Angle α was 88° and angle β was 44°. The illumination of display panel 12 was simulated in two-dimensions (cross-section) by the optical rays from a line source 20 described by a series of twenty light beams (or fans) that extend along the side of the light source facing the display panel. Each fan, tilted at 2° to the horizontal (γ=2°), contained 400 rays evenly spread across its 8° span. Directly beneath display panel 12 was a measurement surface that collected the rays and discriminated the illuminance spatially into bins as a percentage of total light source emission.

Figure 8:
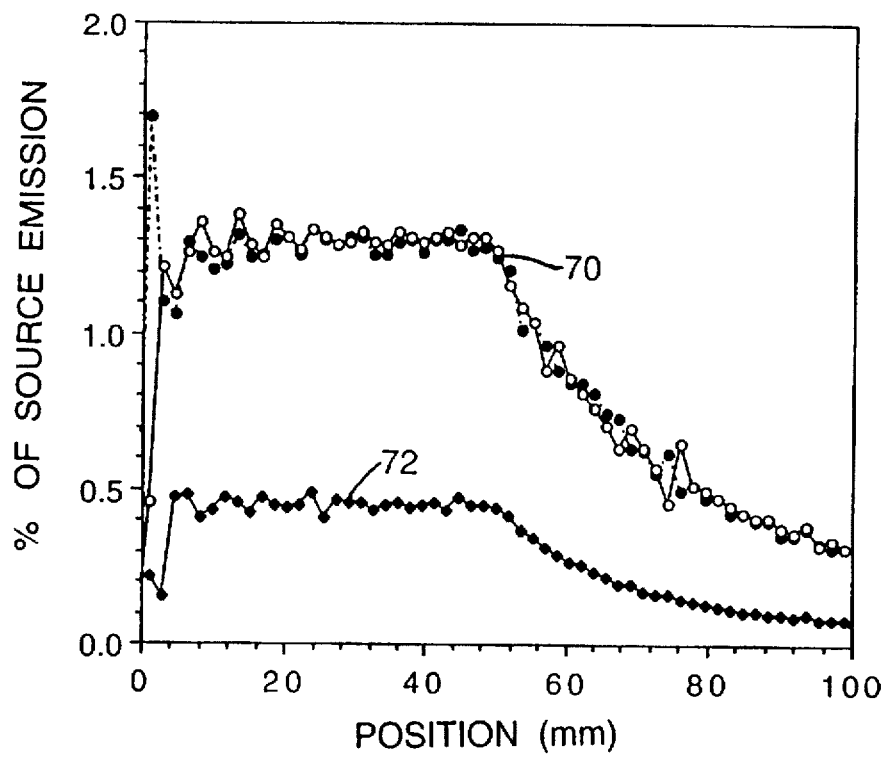
FIGS. 8-10 show computer modelled graphs of percentage source emission as a function of position across a display for various embodiments of the system shown in FIGS. 1 and 2.

The percentage of source emission was calculated as a function of position across the width of the display panel both with and without film 16. The results are shown in FIG. 8, where line 70 represents the illuminance with film 16 in place and line 72 represents the illuminance without the film in place. In line 70, the open circles represent the illuminance at the top of film 16 and the closed circles represent the illuminance directly below display 12. The fact that the open and closed circles form a single line 70 indicates that there is minimal reflection loss at the surface of film 16.

With the film 16 in place, 55% of the light from the light source reached the measurement surface, compared to only 18% without the film. However, qualitatively speaking, the viewer would see an even greater improvement than the three-fold enhancement here. This is true because the back reflector of a reflective liquid crystal display (LCD) is directionally diffuse (or diffusely specular), thus most of the light that is transmitted through a bare LCD surface is reflected by the back reflector at approximately the angle of incidence. It follows that most of the light returns through the LCD/air interface toward the right at a glancing angle and is not useful to a viewer. Therefore, the actual improvement is much greater than a factor of 3.

Figure 9:
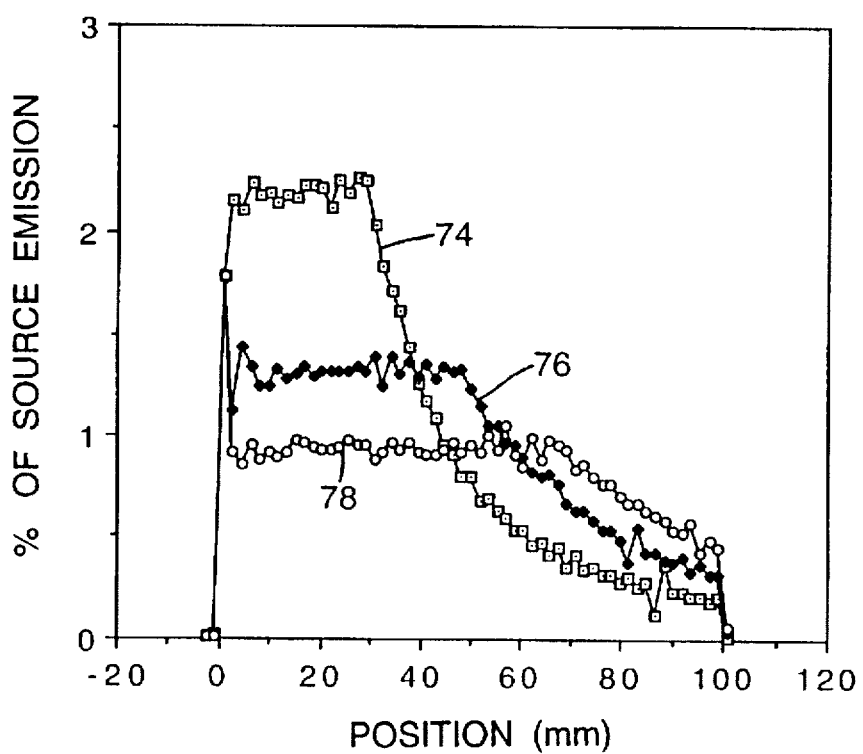

The dependence of illuminance on the height of light source 20 is shown in a computer modelled graph of FIG. 9. The total light on the LCD was measured for light source heights of 3, 5, and 7 mm to be 63%, 56%, and 49%, respectively. As the graph shows, the 3 mm light source (represented by line 74) gives greater brightness over portions of the display, but with poor uniformity across the width of the display. The 7 mm light source (represented by line 78) is less bright over the same portion of the display, but has greater uniformity across the width of the display. The 5 mm light source (represented by line 76) represented an intermediate case between these two extremes.

Figure 10:
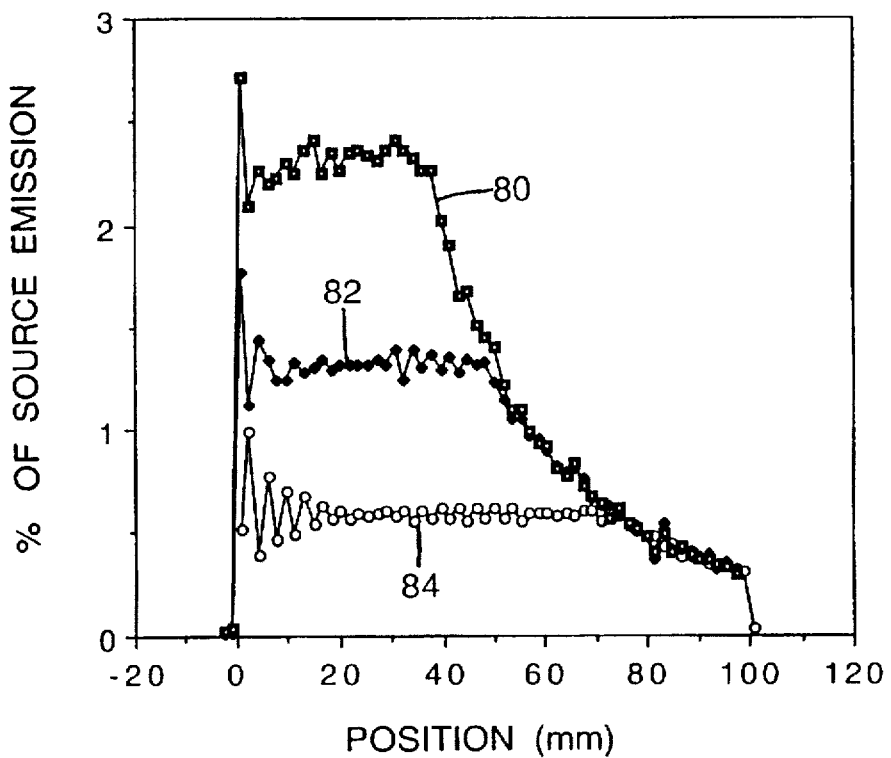

The dependence of illumination on the angle γ that light beam 26 strikes display panel 12 is shown in a computer-modelled graph in FIG. 10. The total light on the LCD was measured for a 5 mm light source and having angles γ of 0°, 2° and 4°. As the graph shows, light rays striking the LCD at an angle γ of 4° (represented by line 80) were brighter over a portion of the LCD, but were not uniform across the display. Light rays striking the LCD at 0° (represented by line 84) were less bright over that same portion, but were uniform across the width of the display. An angle γ of 2° (represented by line 82) represented an intermediate case between these two extremes.

EXAMPLE 2

Figure 11A:
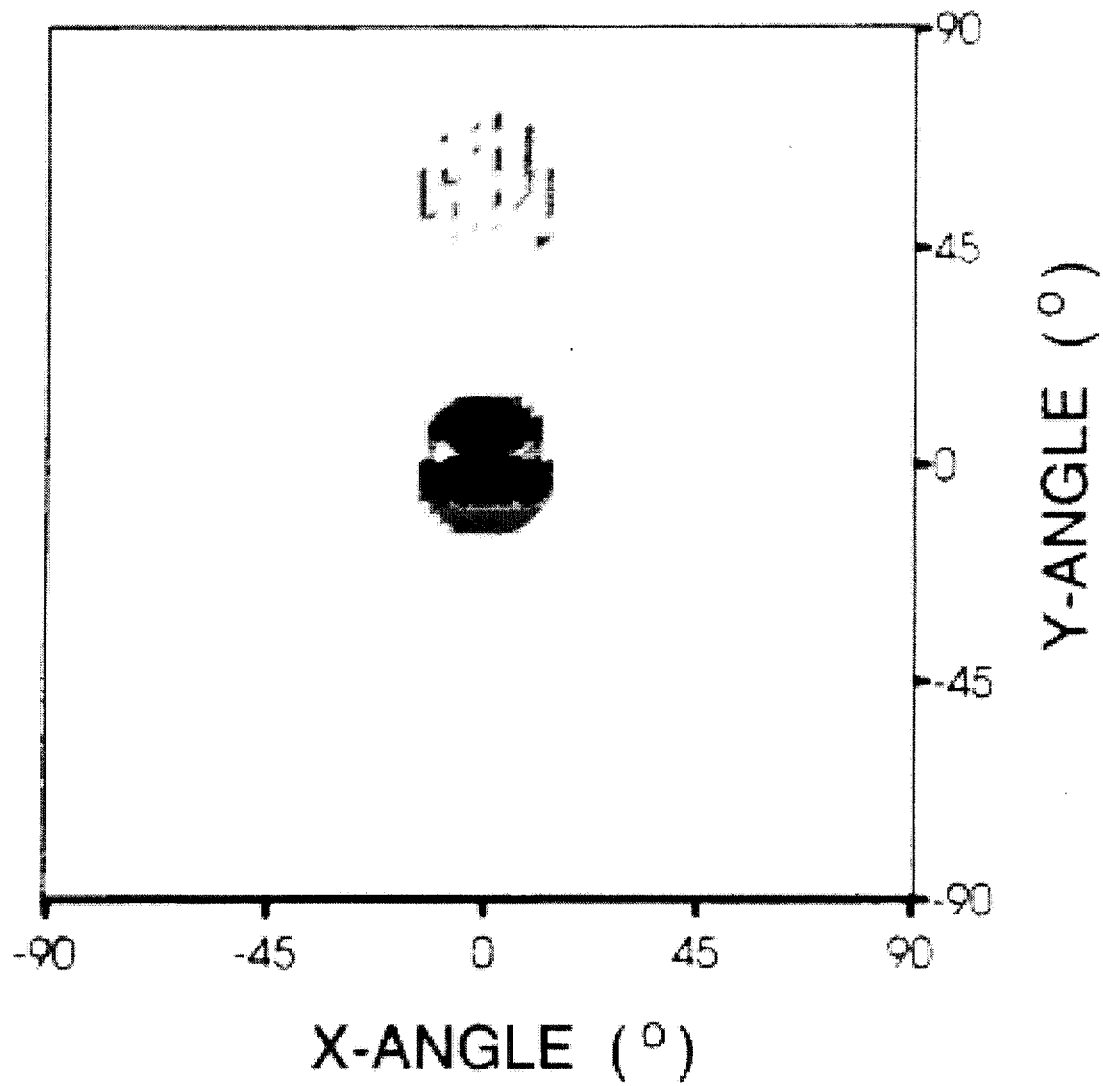
FIGS. 11A and 11B show computer modelled graphs of light emission from light pipes having square and circular cross-sections, respectively.
Figure 11B:
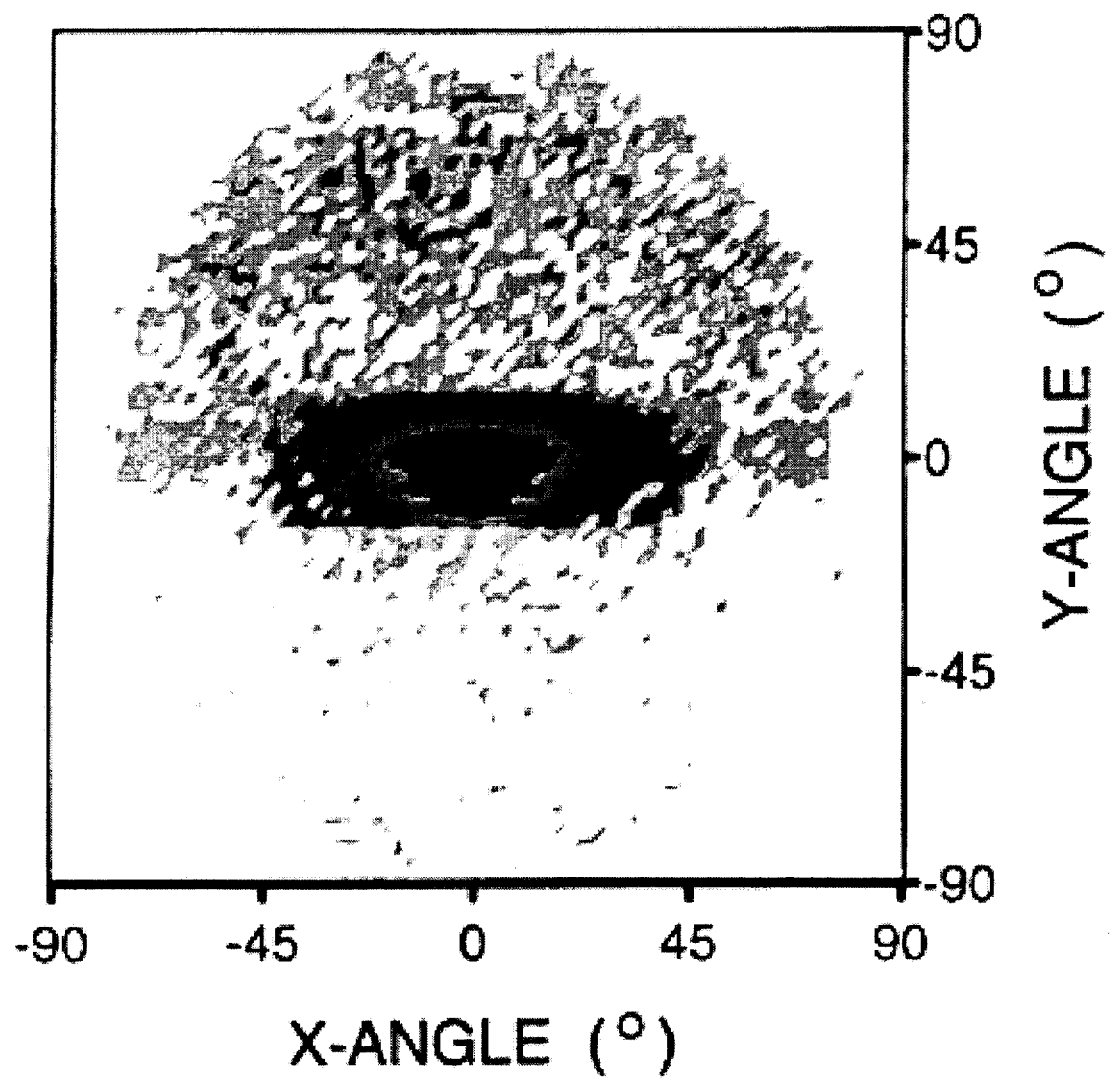

A light pipe similar to that shown in FIG. 4A having a square cross-section and V-shaped notches having an angle χ of 45° was compared to a light pipe having similar notches and a circular cross-section via computer modelling. A line of optical ray cones, having a cone angle of $\Theta_{1/2}=14°$, was launched into the input aperture of the light pipes. FIGS. 11A and 11B show calculated emission patterns from the light pipes where the x-axis is the observation angle about the axis (length) of the light pipe and the y-axis is the observation angle along the length of the light pipe, i.e., substantially in the plane of the display.

The calculated emission pattern for a light pipe having a single notch and a square cross-section is shown in FIG. 11A. The calculated emission pattern for a light pipe having a single notch and a circular cross-section is shown in FIG. 11B. The density of the scatter plot corresponds to the intensity of light. The high density pattern in FIG. 11A (square cross-section) is approximately a cone having a cone angle $\Theta_{1/2}=14°$, while in FIG. 11B (circular cross-section) the light scatters to a much wider emission pattern. Thus, the square cross-section of the light pipe of the present invention preserves the modes emitted from the light source, i.e., the cone of emission from the light pipe is about the same as that from the light source.

EXAMPLE 3

Figure 12:
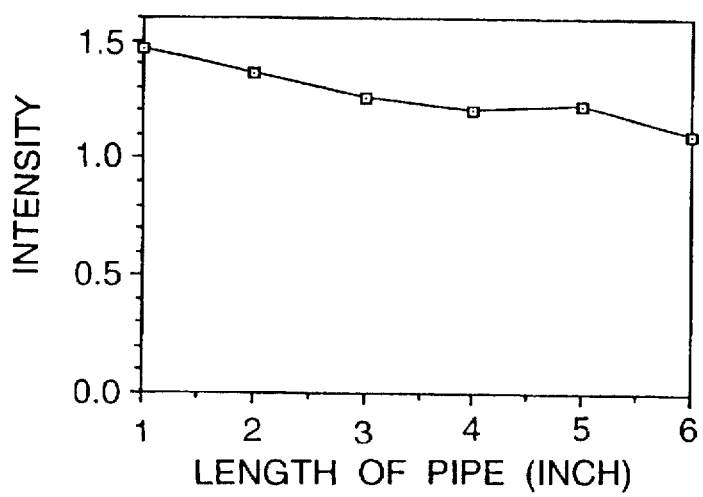
FIG. 12 shows a graph of light intensity as a function of position along the length of a light pipe according to one embodiment of the present invention.

A light pipe resembling that shown in FIG. 4B was constructed. The light pipe wedge formed an angle of 1.2° and had 6 μm wide step facets with a uniform pitch of 52/cm. It tapered from 4 mm by 4 mm at the input aperture to 4 mm by 0.6 mm at the distal end. An amber AlInGaP LED (Hewlett Packard part HLMP-CL00) was mechanically secured against the aperture of the light pipe. A silvered reflective film (EPC-300 Energy Control Products Division #300 "Silverlux", 3M Company, St. Paul, Minn.) was mechanically secured against the faceted side of the light pipe. The light intensity was measured at several positions along the length of the light pipe. The results, shown in FIG. 12, indicate that light intensity (measured in arbitrary units) was relatively uniform along the length of the light pipe.

I claim:

1. A line light source comprising:

a point light source; and a light pipe, having a rectangular cross-section, for converting the point light source into a line light source, wherein light rays from the point light source enter one end of the light pipe, travel along a length of the light pipe, are reflected off a surface on one of the four sides of the light pipe, and exit the light pipe via a side of the light pipe opposite said one of the four sides, wherein the surface has a plurality of notches formed therein.

2. The line light source of claim 1, wherein the point light source is a light emitting diode.

3. The line light source of claim 2, wherein the light emitting diode emits light rays having a cone angle $\Theta_{1/2}=14°$.

4. The line light source of claim 1, wherein the cross-section of the light pipe is square-shaped.

5. The line light source of claim 1, wherein each notch comprises two faces, one of which is oriented at an angle, x, of about 45° with respect to said one of the four sides.

6. The light source of claim 1, wherein the notches are distributed along the length of the light pipe nonuniformly, wherein the frequency of the notches is greater at the end of the light pipe opposite the point light source than at the end of the light pipe adjacent the point light source.

7. The light source of claim 6, wherein the frequency of notches is within the range from about 5 to 100/cm.

8. A line light source comprising:

a point light source comprising a light emitting diode; and a light pipe, having a square cross-section, for converting the point light source into a line light source, wherein light rays from the point source enter one end of the light pipe, travel along a length of the light pipe, are reflected off a surface on one of the four sides of the light pipe, the surface having a plurality of notches formed therein, and exit the light pipe via a side of the light pipe opposite said one of the four sides of the light tube, wherein each notch comprises two faces, one of which is oriented at an angle, x, of about 45° with respect to said one of the four sides of the light pipe.

9. A front lighting system comprising:

a display panel;

a point light source; and a light pipe, having a rectangular cross-section, for converting the point light source into a line light source, wherein light rays from the point light source enter one end of the light pipe, travel along a length of the light pipe, are reflected off a surface on one of the four sides of the light pipe, and exit the light pipe via a side of the light pipe opposite said one of the four sides, wherein the surface has a plurality of notches formed therein.

10. A line light source comprising:

a point light source; and a wedge-shaped light pipe having a plurality of step-facets, the light pipe having a rectangular cross-section which decreases in area along the length of the pipe from the end of the pipe adjacent the point light source to the opposite end of the pipe, whereby light rays from the point light source enter the end of the light pipe adjacent the point light source, travel along a length of the light pipe, are reflected by the step-facets, and pass through a side of the light pipe opposite the step-facets.

11. The light source of claim 10, wherein the point light source is a light emitting diode.

12. The light source of claim 10, wherein the step-facets are oriented at an angle, x, of about 45° with respect to the length of the light pipe.

13. The light source of claim 10, wherein the plurality of step-facets are uniformly distributed along the length of the light pipe.

14. The light source of claim 10, wherein the cross-sectional dimensions of the light pipe are 4×4 mm at the end adjacent the point light source and 4×0.6 mm at the opposite end.

15. The light source of claim 10, wherein the wedge forms an angle of 1.2°.

16. The light source of claim 10, wherein the step-facets are 6 μm wide.

17. The light source of claim 10, wherein the step-facets have a frequency of 52/cm.

18. The light source of claim 10, wherein a silvered reflective film is secured to the stepped-side of the light pipe.

19. The light source of claim 10, wherein the frequency of the step-facets is within the range from about 5 to 100/cm.

* * * * *